UNITED STATES PATENT OFFICE

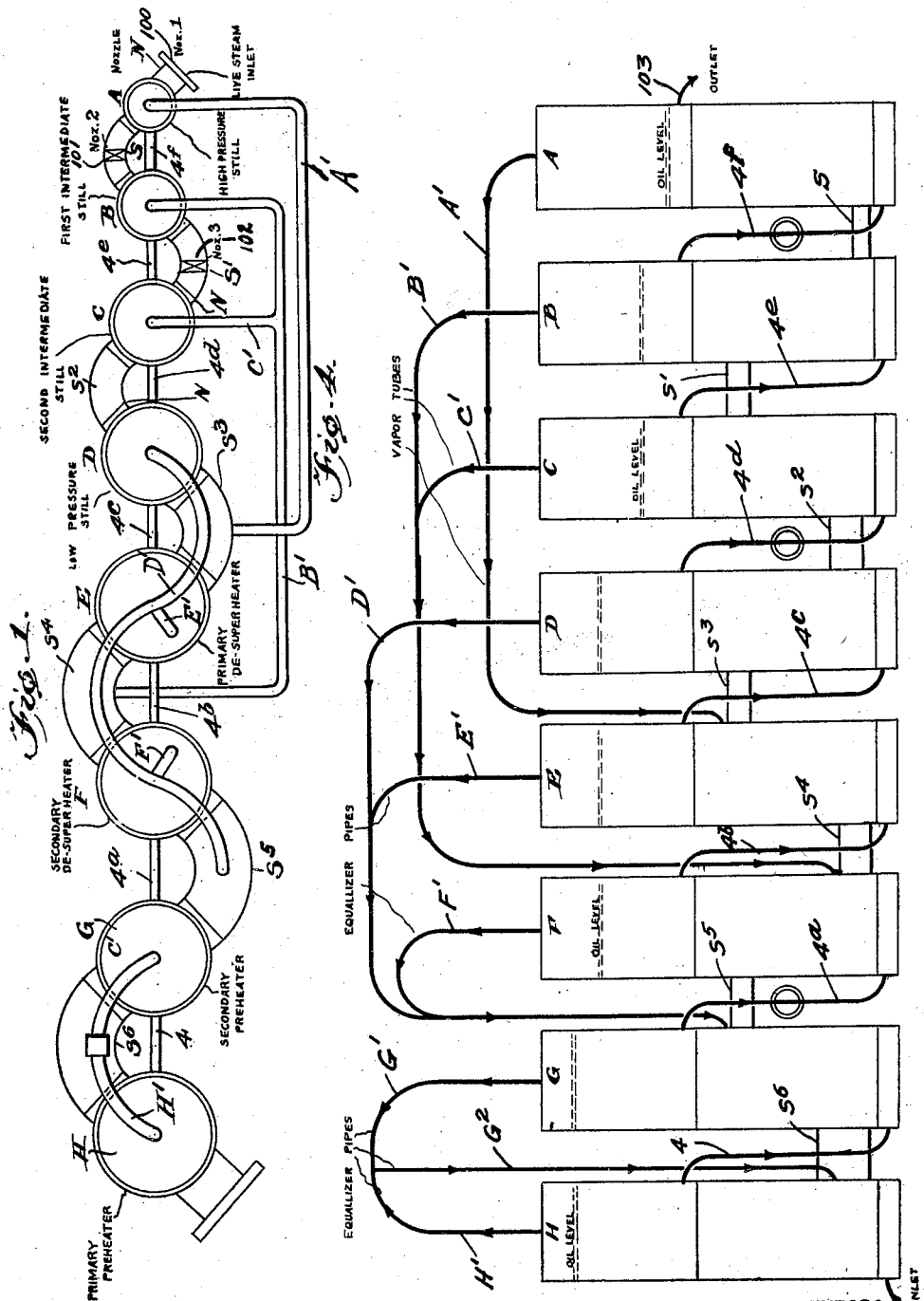

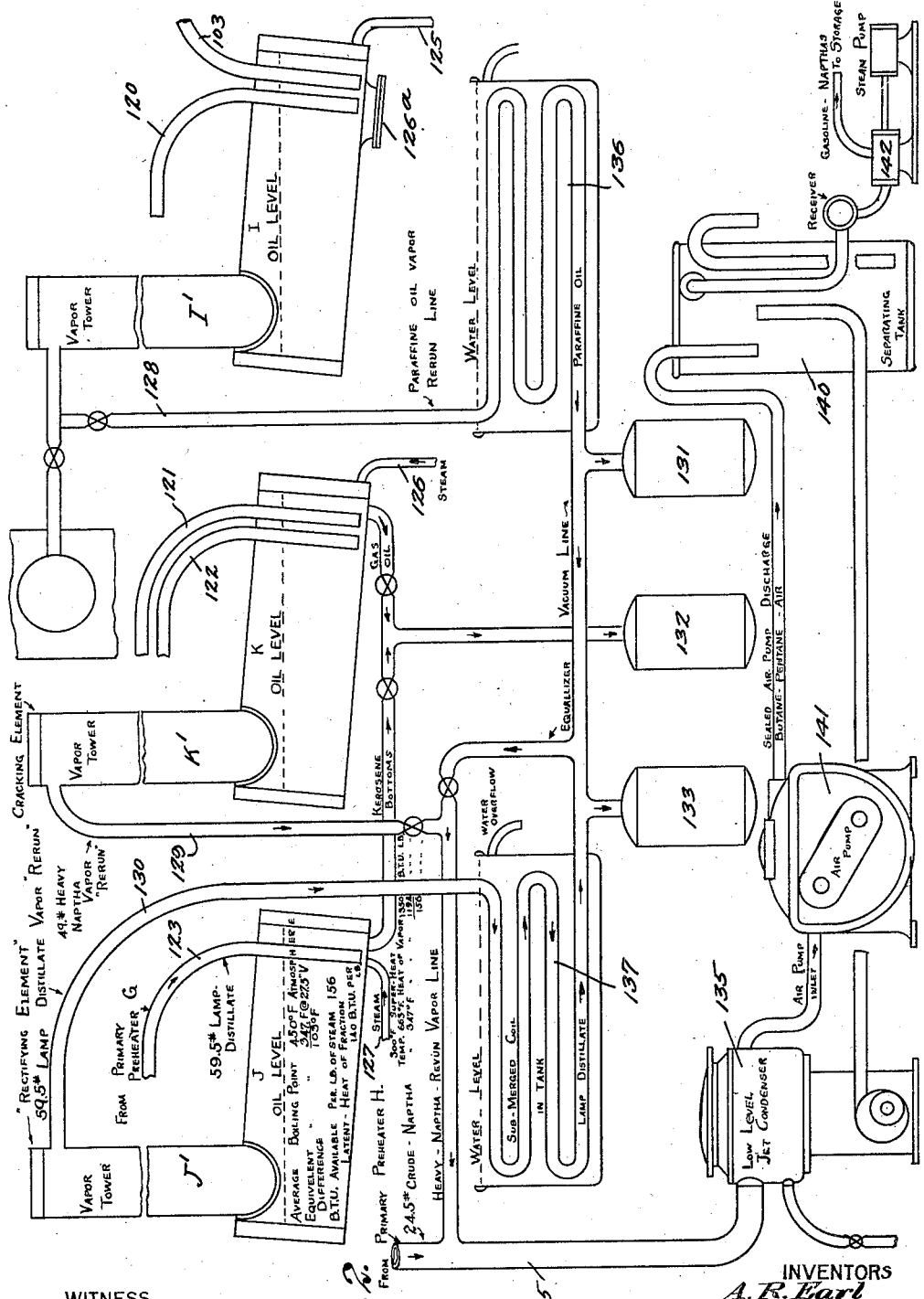

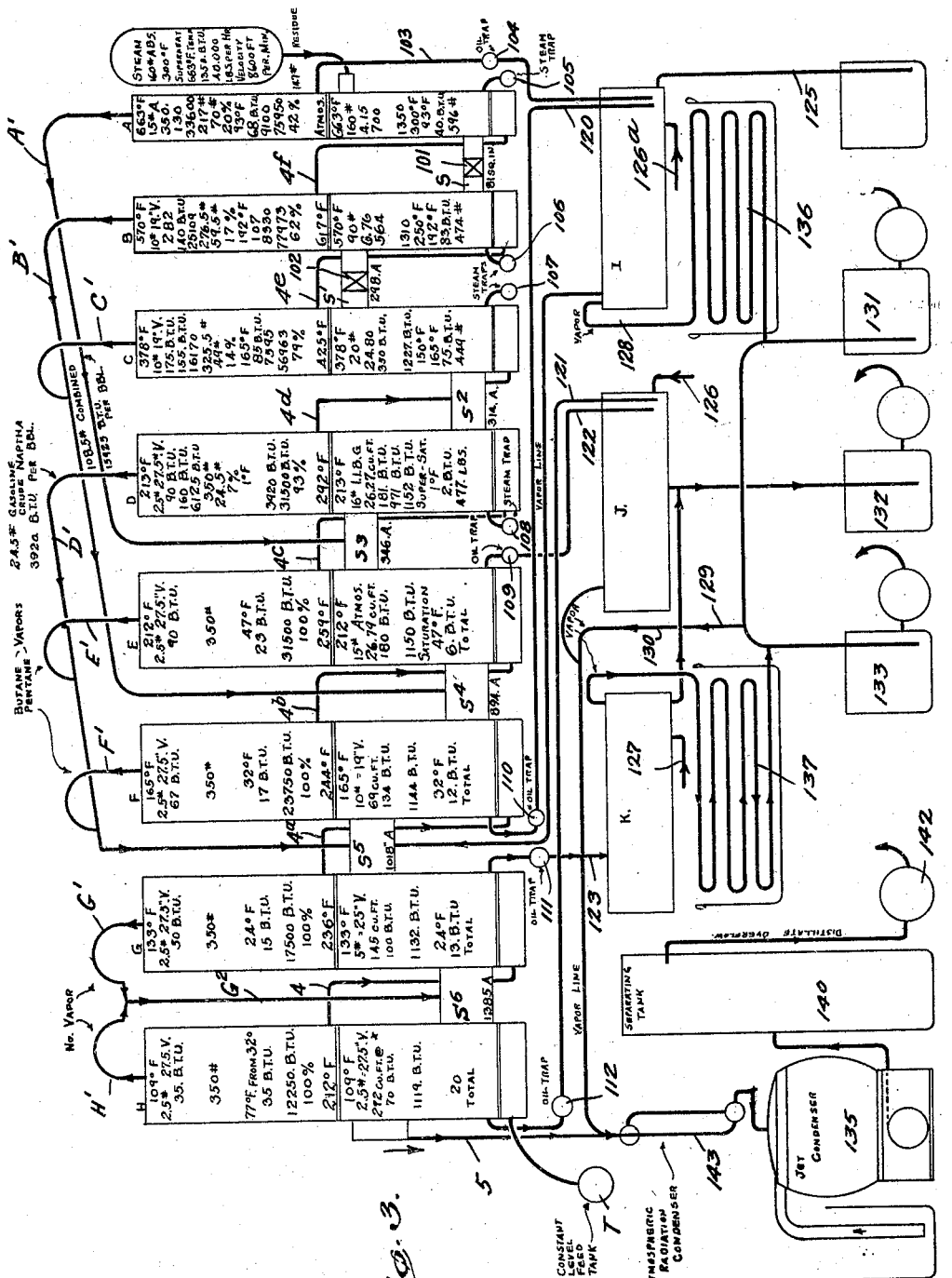

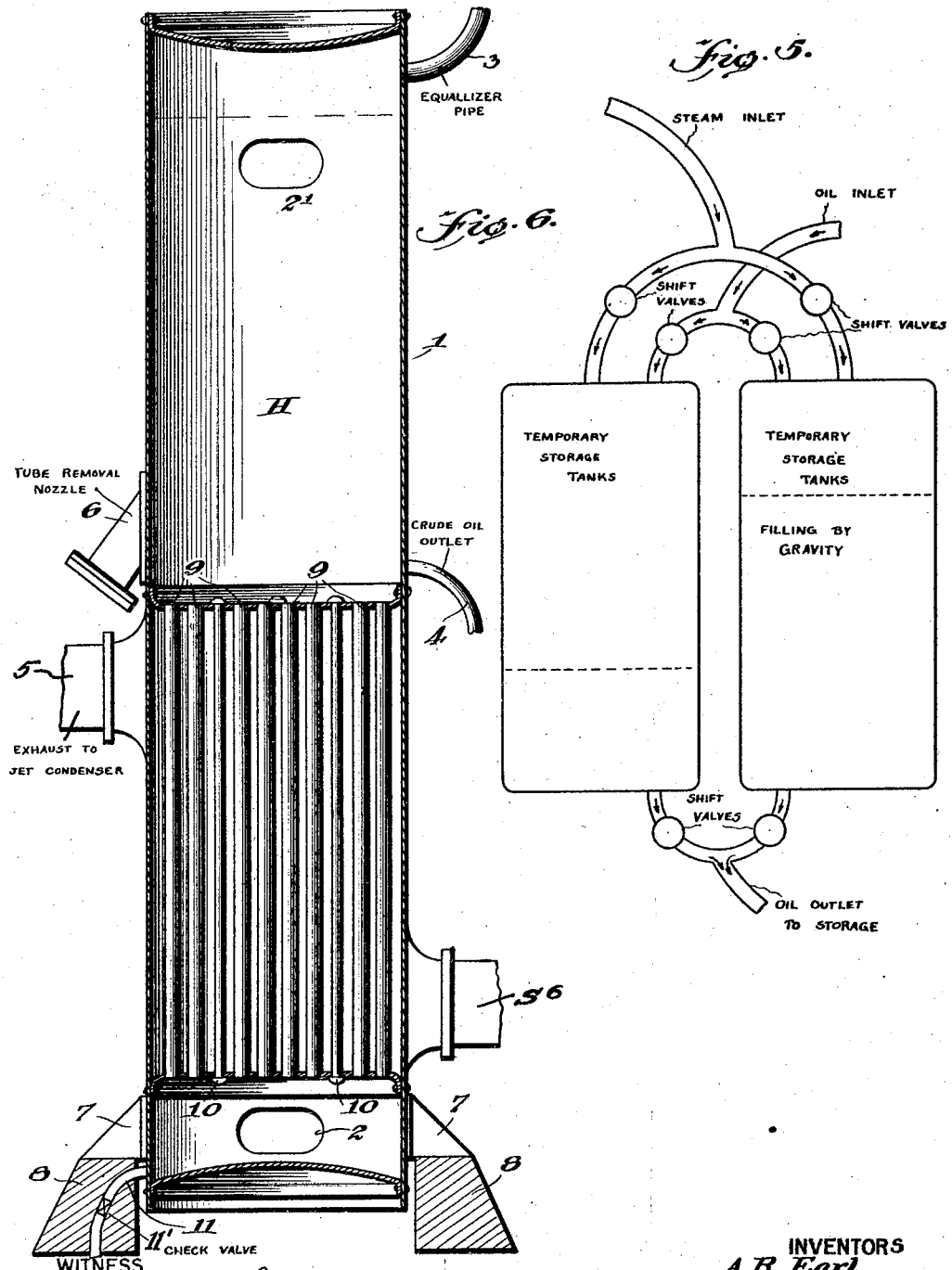

ALFRED R. EARL AND THOMAS W. REEVES, OF TOLEDO, OHIO

PROCESS OF FRACTIONATING LIQUIDS SUCH AS MINERAL OILS AND THE LIKE

Application filed February 25, 1927. Serial No. 170,837.

The invention relates to a process of separating a liquid composed of a group of components having widely separated boiling points, more specifically dealing with the operation of such components as are found in the various mineral or petroleum oils, and particularly refers to such fractionating processes as applied to such mixed liquids as just mentioned, wherein the distillation is carried on by the aid of steam, and under pressure lower than the pressure of the surrounding atmosphere.

The invention has for its object the provision of a continuous process of fractionating, wherein are obtained invariable results in regard to gravities of the fractions, secondly the utilization of heat which is usually wasted and thirdly a more advantageous method of carrying out the processes of fractionating liquids of the class described and more expeditiously and economically fractionating them.

The process is notable for its utility, for its concentration as to operation, for its flexibility of operation, its adjustability of varying operating conditions with diminished destructiveness of the higher grade fractions. One method, illustrative of the process, is diagrammatically illustrated in certain figures of the drawings, other figures illustrating the connections, by the various units of the system of distillation, and of the construction of certain units of the system.

Figure 1 illustrates diagrammatically a plan of the various still units and the method of connecting these units, Figure 2 illustrates a diagrammatic flow sheet of one stage of the process, showing the products of distillation through various units, Figure 3 illustrates in diagrammatic fashion a flow sheet illustrating the passage of the vapors through the various still units and through various containing units of the system, Figure 4 represents in diagrammatic fashion the crude oil flow-vapor flow and equalizer pipe connections between the various still units of the system, Figure 5 diagrammatically illustrates the connections between the condensing units and the temporary storage tanks showing diagrammatically, the mains introducing the oils and steam to the temporary storage tanks and the valve connections for controlling the direction of flow of oil and steam, and Figure 6 represents diagrammatically the construction of one of the still units, these still units being similarly constructed in the several instances.

Referring first to Figure 1, there are shown a series of heating units for the oil shown diagrammatically by members A, B, C, D, E, F, G, and H, these elements constituting the main heaters of the system. Member A is a high pressure still delivering its vapors through pipe A' and a conduit $S^3$ to member E which may be regarded as a primary de-superheater still. This still is in fact a preliminary de-superheater and is connected to pipe D' by the pipe E'. The pipe D' is connected between the member D and the conduit $S^5$. A secondary de-superheater F is connected with the superheater E by a conduit $S^4$. A secondary preliminary heater G is connected by a conduit $S^6$ and pipe G', $G^2$, and H' to a primary heater H. These various units are connected in series as indicated in Figs. 1 and 4, the steam passage connections between them being represented by reference letters S to $S^6$ inclusive on Figure 1. Unit D is connected by a pipe D' and a conduit $S^5$ to unit G, while units B and C are connected by pipes B', C' and conduit $S^4$ to unit F. In a similar manner, units D and E are placed in communication with unit G by means of pipes D', E', and conduit $S^5$. Furthermore unit A is connected to unit B by a conduit S; unit B with unit C by a conduit S', and unit C with unit D by a conduit $S^3$. The connections between members A, B, and C are provided with nozzles to admit the flow of steam, these nozzles serving for the control of steam flow through the process, which the cross sectional areas S to $S^6$ and proportions thereof secure to the elements which they connect. In practice the flow nozzles are three in number. The first or initial flow nozzle 100 is connected between the high pressure still A and the initial supply of steam at the inlet of the high pressure still. This nozzle controls the volume of steam. The second flow nozzle 101 is what may be termed a ratio flow nozzle between the initial flow nozzle and the third and main control nozzle 102. This third nozzle is the main control nozzle, this being where a 55% drop takes place, and controls the weight in pounds of steam. These nozzles increase in diameter progressively in proportion to the volume of the steam compartments they connect. The succeeding steam connections between the following stills would likewise increase in diameter but with no nozzles inserted in the same. These nozzles form governors which control the rate of capacity which has been pre-determined and as the load of the process is constant and does not vary like the loads of a power plant do, no regulating device is necessary as the flow of steam through these nozzles serves the purpose of a mechanical regulator. For reference to the subject matter of steam flow nozzles attention is called to Kent's Handbook for Mechanical Engineers.

Illustrated in Figure 6 is one of these heating elements the member H having been taken for the purpose of the illustration. It will be understood that the construction of the remaining heating elements are in each case similar to the particular construction, the ends of the shell 1 being dished and flanged the convexed side being placed inwardly. A port 2 for the incoming oil is provided between the lower sheets and the bottom heads. This opening is large enough for a workman to enter the still. Similar opening 2' is provided at the uppermost part of the still. In the upper part of the still as shown at 3 is an "equalizer pipe" by means of which the oil level in the still and the pressure therein may be equalized with respect to the oil level and pressure in the remaining units. At 4 is designated a crude oil outlet. Above the tube sets is provided a space which is about a foot longer than the length of the tubes and said space is in communication with a conduit 6 through which a tube may be removed when withdrawn or replaced. Connection 5 defines an exhaust of a jet condenser 135 by means of which a vacuum is produced in the system. The still is supported by members 7 resting upon suitable supports such as concrete piling 8. The crude oil inlet to the bottom of the shell 1 is represented by passage 11. In passage 11 there is inserted a check valve 11', the object of this check valve is in case a vacuum in the system should be broken the variant oil levels of the several stills would seek a natural level overflowing through the constant level tank also at the outlet of the high pressure still. The tubes 9 of the still are held in place by tube-sheet stays 10. The primary connection is piped to the initial steam supply as shown in Figure 1, and the final connection to a standard type of steam condenser. The final unit of the heating series has an inlet at its bottom-most compartment that extends to a constant level tank T; and an outlet slightly above the top tube sheet of the upper-most compartment that leads downwardly to the bottom-most compartment of the preceding element, and so on consecutively, the several elements being connected by pipes 4, 4$^a$, 4$^b$, 4$^c$, 4$^d$, 4$^e$ and 4$^f$. The pipes that connect the high pressure still element with the first intermediate still element, the second intermediate still element with the low pressure still element, also the secondary de-superheater element with the secondary preheater element has incorporated therein a quick opening gate valve.

An oil outlet slightly above the top set of the primary element which is the high pressure still element, is piped at 103 to an oil trap 104 that discharges into a regenerative still element I.

The four still elements have steam traps 105, 106, 107, 108, respectively connected to the steam compartment externally of the tube elements; also the four de-superheater and pre-heater elements have oil traps 109, 110, 111 and 112 likewise connected.

As illustrated diagrammatically at Figure 3 the last element of the series is connected to a constant level feed tank T, the construction of which does not form a part of the present invention.

There are also provided regenerative and re-run still elements I, J and K, which are cylindrical tanks with vertical towers upon the same and these tanks lie horizontally inclined as shown in Figure 2. These elements are to be in duplicate and to alternate in operation. There are of course the necessary fractional oil inlets 103, 120, 121, 122, and 123, steam inlets 125, 126, and 127 and at the upper-most part of the towers or domes vapor outlets 128, 129, and 130 provided with the necessary valves and connected to the succeeding order of the system. This construction will be obvious to any engineer who is familiar with the installation of such systems to which the present system relates.

This construction of the regenerative steam still elements is identical in the rectifying steam still element; residual oil pipe lines, with necessary valves that are required, lead to containers 131, 132, and 133 of ample capacity and strength, for temporary storage, before the liquids are placed in permanent storage.

The containers are in duplicate for like fractions, and in dual connections by piping and necessary valves, for oil and steam inlet, likewise oil outlets, in order to provide for flexibility for alternate and periodic operations of the oil disposal.

Vapor pipe lines leading from the regenerative, secondary re-run, still elements, with necessary valves for shunting the vapors at the will of the operator, discharge their content back to a predetermined stage in the primary separating element, or, either indirectly into the steam condenser through the medium of integral, consecutive, coiled pipe condensing elements 136 or 137, submerged in water in the tank, with a water inlet and outlet; the condensed vapors collect in containers 131 to 133 inclusive and the uncondensed vapors pass through pipe equalizer elements into the steam condenser 135. The connections are shown diagrammatically in the accompanying drawings and will be obvious to the individual skilled in this art.

The steam condenser 135 mentioned herein and shown diagrammatically in the drawings is preferably of the low level jet type, the same forming no part of the present invention. It is however, of the type which lifts its own injection water, and which is provided with a submerged removal pump discharging its condensate into a separating tank 140. The air pump 141 is of the compression type and may be either rotated or reciprocated. Said pump discharges its content to submerge it in the same separating tank. The water overflow of this tank is to be used in connection with a pipe coil condenser or the like and the oil overflow is piped to the receiver of a receiving pump 142 that discharges the content to storage or other disposal.

There are also provided atmospheric radiation condensers 143 which comprise drum or cylindrical tank elements, with concave heads and manholes; the condensers being connected together with an intermediate tube element and set horizontally inclined for drainage.

Steam, at a reasonable pressure of 160 pounds absolute, 145 pounds gauge, and with a practical super-heat of 300° F. flows from a steam boiler of a standard type, to and through a super-heater element, and discharges through an initial steam flow nozzle into the high pressure still element of the present system.

The capacity of the nozzle and the volumetric content of the still element is proportioned to the steam pressure and temperature; also the capacity of nozzle through which the steam is discharged from the high pressure still element into the first intermediate still element. The steam so flowing, under a predetermined reduced pressure, by means of the flow nozzles, would expand to an increased volume, proportioned to the reduced pressure and a partial liberation of the steam's total heat content, relative to the pressure and temperature so reduced, would result. The steam so expanded, internally of the steam's compartment, and externally of the tubular element, within the steam compartment of the still element having its heat content partially liberated, represents the secondary initial pressure in the first intermediate still element.

The heat content so liberated, travels by conduction and convection, through the steam vapor, the metal of the tubular element and the oil, internally of the tubular element, automatically seeking the thermal equilibrium of a natural temperature balance.

Steam having flowed through the initial flow nozzle and down through the steam compartment of a high pressure still, discharges through the "flow nozzle" connecting the higher pressure still with the first intermediate, then up through its steam compartment and discharges through the main control nozzle into the second intermediate still, down through its steam compartment and discharging through a connection into the low pressure still, then up through its steam compartment discharging through a connection into the primary de-superheater then down its compartment and through a connection into a secondary de-superheater up its compartment and through a connection to the secondary pre-heater down its compartment and discharging through a connection to a primary pre-heater, up its compartment and discharging through a connection to the standard type of jet condenser 135 to be condensed.

The steam so flowing will have increased its volume from 4.15 cu. ft. per pound to 272 cu. ft.; the pressure will drop from 160 pounds absolute to 1 pound absolute and the temperature will drop from 663° F. to 109° F. The total heat of steam will drop from 1350 B. t. u. per pound to 1108 B. t. u., 242 B. t. u. liberated per pound of steam flowing and absorbed by the oil; the latent heat of the steam to be condensed will be 1032 B. t. u. per lb., the condensing water will absorb 30 B. t. u. per lb., and 34 lbs. of condensing water will be required per pound of steam.

If the initial flow nozzle is assumed tentatively to be eight inches in diameter, with 50 square inches of area, then the steam pressure and temperature mentioned will have a velocity of approximately 8600 feet per minute, and the weight of steam will be approximately 40,000 pounds per hour.

The volume ratio nozzle, main control nozzle, their connections, and the consecutive succeeding connections, also the volumetric content of the steam compartments would be relatively proportional for a unit, through which the steam would flow approximately along the theoretical adiabatic expansions curve line of no heat transmission.

The heat required to raise the boiling point of the oil from the first intermediate still element to the boiling point in the high pressure still element plus the latent heat of vaporization of the fraction so vaporized, would be supplied by the heat liberated by the steam, expanding through the high pressure still element, and a natural heat exchange takes place by way of a temperature balance.

The heat required by the fraction to be vaporized and the heat liberated by the expanding steam in the high pressure still element would be in a ratio of 1 to 1.71, or approximately 600 pounds steam per initial barrel of 350 pounds crude petroleum, and the rate of capacity would be 66 barrels per hour for the unit. The same proportion would be in duplicate in the 3 consecutive still elements wherein evaporation takes place, but at a relative and succeeding lower pressure and temperature, and, likewise, in the 4 remaining de-superheater and pre-heater elements, but with practically no evaporation or latent heat required.

The flow of steam through the process is governed by the flow-nozzles, and in principle is approximately the same as in a steam turbine.

Crude petroleum, to be distilled, flows by gravity to the constant level feed tank, from where it is drawn inductively by the vacuum maintained by the steam condenser; and the altitude of the column of oil in the several elements will be proportional to the vacuum, into which the vapor lines of the elements discharge.

The vacuum in the oil compartments of H. and G. will be 27.5 inches mercury; the same as it is in the steam compartment of H. into which the equalizer vapor lines lead, and the potential hydrostatic head of the column of oil so supported will be 39 feet and six inches above the oil level in the constant level feed tank.

The vacuum in the oil compartments of F. E. and D., will be 25 inches mercury, the same as the steam compartment of G., in which the equalizer vapor pipes of F. E. and D. lead, and the altitude of the column of oil so supported will be 34 feet and 9 inches, and the difference of altitude, or flow head between G. and F. will be 4 feet and 9 inches, as a kinetic head. The pressure in this case is absolute.

The vacuum in the oil compartments of C. and B., whose vapor lines lead to the steam compartment of F., will be 19 inches, and the column of oil so supported will be 26 feet and 9 inches, and the difference of altitude of the oil columns between D. and G. will be 8 feet, as a kinetic head.

The oil compartment of the element A whose vapor line discharges into the element E. will be at a pressure of one atmosphere and its oil level will be at 1 foot above its upper tube sheet, and maintained there by the over-flow outlet, that discharges through a float valve into the regenerator, and steam still element I.

As vaporization would take place in the still elements A. B. C. and D., due to the heat liberated in the steam compartments of same, there would be a tendency to unbalance the potential heads, which would immediately be replaced in balance consecutively by the higher potential heads of the succeeding elements; and ultimately more oil, proportioned to the amount vaporized, would be drawn into element H. from the constant level feed tank in a natural hydrostatic balance.

As vaporization of the fractions of the initial crude petroleum would be the factor governing the flow of oil through the process, the gravity of the several fractions so vaporized would remain constant, relative to the chain of boiling points, proportioned to the balance of temperature, with the steam in the element, from which the fractions were vaporized.

As the oil feed is induced, and the unvaporized fraction flows away by gravity, no pumping is required by the primary separating element.

In the first four elements, A. B. C. and D. the oil flow would be turbulent, due to the ebullition, while in the four remaining elements—E. F. G. and H. a quiescent flow would obtain.

Mid-continent crude petroleum of .8000 specific gravity, .5000 specific heat, weighing 350 pounds per barrel, at a temperature of 32 degrees Fahrenheit, is assumed to be progressing through the process.

The oil will be raised in temperature 77° F., from 32° F. to 109° F. by absorbing 35 British thermal units per pound, as it passes through the primary pre-heater H. to the secondary pre-heater G. where it will be raised 24° F. from 109° to 133° F. by absorbing 15 B. t. u. per lb.; then through the secondary de-super-heater, where it will be raised 32° F., from 133° F. to 165° F. by absorbing 17 B. t. u. per lb.; then through the primary de-super-heater E. where it will be raised 47° F. from 165° F. to 212° F. by absorbing 23 B. t. u. per lb., and where some gases—butane, pentane, and the lightest naptha, will distil through the vapor line of the primary de-super-heater E.

The oil, then passing through the low pressure still D. will be raised 1° F. from 212° F. to 213° F. which is the theoretical for saturated steam, when highly super-heated steam expands through a turbine, pressure reducing-valve, or an apparatus of the nature herein described, the heat content of the vapor is not relative to the temperature, and this condition is called super-saturation or an unnatural super-heat, and the steam is said to be cooled—as the heat content of the vapor is greater than its temperature.

This condition would exist, beginning in the low pressure still, where the initial steam pressure will have been reduced to atmospheric and continue through the two de-super-heaters, as a natural condition of the steam, which will be further intensified by the hot oil vapors flowing from the high pressure still A and confluently with the steam through the primary de-super heater E.

Also, the vapors from stills B and C flowing jointly and confluently with the steam through F; the actual amount of his condition is unknown.

It is assumed, for simplification, that the specific gravity and heat remains constant at .8000 and .5000 respectively, throughout the process, and no unavoidable radiation heat losses are considered; the sensible heat of liquid content of the oil is deducted by the analogy of water at like temperatures, and the latent heat of vaporization is empirically deducted from the meager information on the subject, by Mabery and Goldstein, and published by Bacon and Hamor, American Petroleum Industry, vol. 1, page 108, 5th impression.

The vapors leaving the primary de-super-heater E are trivial in volume and not accounted for, as the oil progresses from the element E to the element D or a temperature of 213° F. due to the sub-atmospheric pressure within the oil compartment of D.

As the average boiling point—200° F.—at atmosphere, of the light naptha fraction has been reached and passed, ebullition will take place, and seven per cent, or by weight, 24.5 lbs. of the initial 350 lbs., per barrel, will vaporize; the latent heat, assumed at 160 B. t. u. per lb. will total 3920 B. t. u. for the fraction of 24.5 lbs. and the heat of liquid will be 90 B. t. u. per lb., and total 31500 B. t. u. for the initial 350 lbs. of oil per bbl., the 160 B. t. u. latent heat, plus the 90 B. t. u. heat of liquid, equals 250 B. t. u. as the toal heat of the vapor per lb., multiplied by the 24.5 lbs. vaporized, equals 6125 B. t. u. as total heat of the fraction, of which 3920 B. t. u. of latent heat must be removed for the physical change of state of condensation.

The remaining ninety-three (93%) per cent, or 325 lbs. of oil, with a boiling point above the temperature 213° F. within the low pressure still D, advances to and through the second intermediate still C.

Where its temperature is raised 165° F. from 213° F. to 378° F., by absorbing 85 B. t. u. per lb., for the total 93%, or 325.5 lbs. of initial crude residue from the low pressure still D., the equivalent boiling point due to the sub-atmospheric pressure, specific to the second-intermediate still C. will be 425° F. and the crude heavy naptha fraction, with an average boiling point of 300° F. atmosphere, will vaporize 14%, or 49 lbs., with latent heat assumed at 155 B. t. u. per lb., that will total 7595 B. t. u. for the fraction, plus 8575 B. t. u., as heat of liquid equals 16170 B. t. u. heat content of the vapor leaving the still C. 79% or 276.5 lbs. unvaporized as residue or still C. will advance to and through the first intermediate still B.

The temperature will be raised 192° F. from 378° F. to 570° F. by absorbing 107 B. t. u. per lb. for the total of 276.5 lbs., the equivalent boiling point will be 617° F. and the "natural lamp distillate" with an average boiling point of 450° F. will vaporize 17% or 59.5 lbs. will be the amount of the fraction, and its latent heat assumed at 140 B. t. u. per lb. will total 8330 B. t. u. the total heat content of the vapor will be 25109 B. t. u. for the fraction; the remaining 62% or 217, lbs., as residue of still B. will advance to and through the high pressure still A.

Where its temperature will be raised 93° F. from 570° F. to 663° F. by absorbing 68 B. t. u. per lb. for the total of 217 lbs., the total heat of liquid will be 350 B. t. u. per lb., and the gas fuel oil stock, with an average boiling point of 550° F. will vaporize 20% or 70 lbs. will be the fraction, and with the latent heat assumed at 130 B. t. u. per lb., the total latent heat of the fraction will be 9100 B. t. u. and 33600 B. t. u. the total heat content of the vapor.

The vaporization now totals 58% or 203 lbs. and the residuum of 42% or 147 lbs. at a temperature of 663° F. and with 350 B. t. u. per lb. as its heat of liquid content, which flows by gravity through an oil trap to the lamp distillate, regenerator, re-run, tar still; the primary separation, or first stage of the process is now complete.

It is observed that the temperature of the oil, and steam, is the same for the same element; also the temperature drop in the steam, and the rise in the oil, by degrees, likewise the B. t. u. (British thermal units), as per the specific heat mentioned.

The heat of liquid content, of the steam compartments, are for saturated steam at that temperature, and correspond to pressures of 2361, 1200, 192 and 15 lbs., absolute, in the super-atmospheric elements A, B, C and D, and 14.7, 10, 5, and 2.5 lbs., barometric in the sub-atmosphere elements, E, F, G, and H; it is understood that these high pressures are substituted by the superheating of the steam 300° F. at 160 lbs. absolute.

The hot vapor flowing at a temperature of 663° F. from still element A enters the steam compartment of the de-super-heater element E and flows jointly with the steam at its temperature of 212° F. the difference of temperature between the two vapors is 450° F. and a temperature balance will take place, whereby the oil vapor will be condensed, and the steam slightly super-heated by the 9100 B. t. u. latent heat of the fraction absorber by the 596 lbs. of steam (required to vaporize it in the still element A) as its equivalent passes through the element E.

The vapors flowing from still elements B and C at temperatures of 570° F. and 378° F. respectively, and then jointly and confluent with the 596 lbs. of steam at its temperature of 165° F. as they pass through the de-superheater element F; a temperature balance will take place whereby both oil vapors will condense; the condensate of the oil vapors mingle, and a re-evaporation of a part of the lower boiling point fractions, of the chain, of vapor from still element C will take place, due to the excess heat of liquid content, of the liquid condensed from the oil vapor from still element B this vapor of re-evaporation will flow along with the steam, to the preheater element G.

The vapors flowing from the still element D and de-superheaters E and F at temperatures of 213° F. 212° F. and 165° F. respectively, and jointly, confluent with the steam vapor at its temperature of 133° F. a temperature balance will take place whereby the high boiling point fractions of the vapor from element D will condense; vapors of low boiling point fractions and water vaporized in the oil, will pass through the vacuum equalizer pipes confluent with the steam in preheater element H. and then to an atmospheric radiation condenser, at a temperature of 109° F. and if the atmosphere temperature be assumed at 90° F. the difference of temperature is 19° F. and the radiation assumed at 1.75 B. t. u. per square foot, per hour, for each degree of difference, then the heat loss by radiation will, approximately be 33 B. t. u. per square foot, per hour; if the injection water of the steam condenser be assumed at 70° F., and the condensate at 100° F. the temperature head of the condenser will be 9° F. and the condensing water will absorb 30 B. t. u. per lb. Evidently each square foot per hour of atmospheric radiation will be equivalent to one (1) pound of water less to be supplied by the condenser: (refer to 1922 trans. A. S. M. E.—page 299; for heat losses from bare pipe) the latent heat of the steam will be 1108 B. t. u. per lb. for 596 lbs. of steam per initial barrel of oil.

It is understood that the boiling point of liquid, and the condensing point of its vapor, always agree for any given pressure and temperature, as the radiation heat loss is unknown, definitely, it is not considered, and all of the fractions are assumed to be at their boiling point.

The 42%, or 147 lbs., residue from still element A. and the 17% or 59.5 lbs. of lamp distillate from de-super-heater F. flow inductively and confluently into the regenerative lamp distillate still element I by virtue of the lesser subatmospheric pressure within same; as the intermediate gas fuel oil fraction has been isolated from same, the difference of liquid heat content will be 68 B. t. u. per lb. between the two liquids, above the lamp distillate boiling point, and totals 9996 B. t. u. for the residue fraction as heat of conversion, into latent heat of vaporization, for the lamp distillate, that requires only 8330 B. t. u. per fraction.

The lamp distillate vapors, rising in the still's tower element, flow inductively by virtue of lesser pressure and confluently with the steam, in the pre-heater element G wherein a temperature balance will take place and the distillate condense. The condensation flowing by gravity to the lamp distillate rectifying steam still element J., until the pre-determined oil level in same is reached; the condensation so flowing is then shunted to the duplicate element. Steam at a temperature of 663° F. is injected into the filled still, until its temperature has reached the boiling point of the gas-fuel oil fraction; this will be 447° F. as the equivalent boiling point of the 550° F. average boiling point at atmosphere.

The lamp distillate vapors, rising in the still's tower, exits through a vapor line, connected consecutively to a submerged pipe coil or the like; condensation takes place and flows by gravity into a container element until the pre-determined liquid level is reached; the stream flowing into same is then shunted to a duplicate element; saturated steam is now injected into the filled container until its temperature reaches 347° F. the equivalent boiling point of the 450° F. average, atmospheric boiling point of the lamp distillate fraction; the volatile, low boiling point fractions of the kerosene chain, will be vaporized and flow jointly with the steam, to the condenser; the fire test of the kerosene residuum will be raised, and when cooled below the flash point, discharged from the container to storage or treatment.

The gas fuel oil fraction, of 20%, or 70 lbs. and the heavy naptha fractions, of 17% or 49 lbs., flows by gravity, from the primary de-super-heater E. and primary pre-heater H. respectively, and confluently within the regenerator naptha still element K.; their temperatures will be 663° F. and 378° F. respectively, and their relative heat of liquid content, 350 B. t. u. and 175 B. t. u. per lb.— a difference of 175 B. t. u.—due to the isolation of their intermediate, lamp distillate fraction. This difference is in excess of the latent heat or vaporization, of the heavy naptha fraction, at a boiling point of 378° F. and re-evaporation of the naptha will take place; the vapors flowing directly to the steam condenser.

When a pre-determined liquid level has been reached in the regenerator element K saturated low pressure steam is blown through the gas-fuel oil residue therein and same is cooled, below the flash point, after which it is drained, into a container element, jointly with the "kerosene bottoms" from the rectifier J. and then discharged from same to storage, or treatment.

The coil pipe condensers, or like, are submarged in tanks of comparatively diminished water space, which is maintained at a constant level by a float valve means, that replenish the tank as fast as the water in same evaporates; the water coming from the separating tank, of the steam condenser, is assumed to be 100° F.; to raise it to 212° F. at atmosphere would require 112 B. t. u. per lb. or from 68 to 180 B. t. u.; the latent heat of vaporization is 970 B t. u., approximately nine times the sensible heat of the liquid; as the temperature of the vapors in these coils is considerable in excess of 212° F., vaporization of the water in the tanks would take place, the lowest condensing point of the vapor would be relative to the vacuum of 27.5 inches, the equivalent condensing point would be raised 103° F. to 315° F. and any fractions with a boiling point under 315° F. would not condense in the coil, but pass through and flow to the steam condenser.

When the 42% or 147 lbs. of tar residue flowing from the high pressure still A has reached a pre-determined liquid level in the regenerator distillate still I the vapors are shunted by valves M from the pre-heater element G to the coil condenser L, which is connected directly to the steam condenser and a container element.

Steam, at a temperature of 663° F. is injected into the residue fractions, within the regenerative still element I its equivalent boiling point will be 766° F. due to the vacuum maintained by the steam condenser, through the coil condenser medium, vaporization will take place;—the oil vapors flowing with the steam to the coil condenser, the 4% or 14 lbs. of coke per fraction remaining in the still element I, and will amount to approximately 11 tons per 24 hours, for a rate of 66 bbls. per hour, throughout the process.

The heat of liquid that has been used to regenerate the lamp distillate, will have to be replaced; it amounts to the latent heat of vaporization of the distillate,—which is 8330 B. t. u.; the latent heat of the 133 lbs. of liquid residue is assumed at 75 B. t. u. per lb. and for the fraction, totals 9975, B. t. u., plus the heat replaced, totals 18305 B. t. u. required by the steam, per fraction.

The high boiling point of the fraction is assumed at 700° F., and the equivalent temperature of the steam 766° F. Therefore, 33 B. t. u. will be available, above 700° F. per lb. of steam, and 555 lbs. (weight) of steam will be required for vaporization of the fraction.

The steam and oil vapors flow jointly, through the paraffine vapor line, to the coil condenser, and the total heat of same will be the total heat of steam at 663° F.—which is 1350 B. t. u. per lb., the heat exchange being simply a latent heat transfer from the steam to the oil, by virtue of the condition of the equivalent boiling point of the oil reached by the temperature of the steam.

As the water in which the coil, or like, is submerged, is kept at 212° F. or the boiling point of water at atmosphere—its latent heat of vaporization is 970 B. t. u. per lb. while the total heat of the steam and oil vapor flowing through the coil will be 1350 B. t. u. per lb.—a difference of 380 B. t. u. per lb.; the sensible heat of liquid of the oil at 663° F. is 350 B. t. u. and at 212° F. 90 B. t. u.— a difference of 260 B. t. u. per lb.

In a natural temperature balance, with the water at 212° F. 380 B. t. u.—plus 260 B. t. u.—a total of 640 B. t. u. per lb., will have to be disposed of by the water, with an absorbing capacity of 68 B. t. u. sensible, from 100° F. to 212° F. plus 970 B. t. u. latent, or 1038 B. t. u. per lb., above 212° F. the oil vapors with a condensing point above 212° F., or the equivalent of 315° F., would condense, and the liquid of condensation, 38%, or 133 lbs. would flow to the container as 22% paraffine distillate; 15% cracked distillate; and 1% wax tailings, at a temperature of 212° F.; the cracked fractions, with a boiling point below 315° F. would flow through the coil condenser, along with the steam uncondensed, to the steam condenser, through the medium of the atmospheric radiation condenser.

The total heat content of the steam will have been reduced 199 B. t. u. from 1350, at 663° F. to 1151, at 212° F. by the coil condenser, then flowing to the steam condenser, with 1151 B. t. u., at 212° F., carrying with it such fractions as may occur, with boiling points below 315° F. to be condensed. The container is then discharged to storage, the cracked fractions separated from the paraffine fractions by settling, and return with the initial crude petroleum.

The napthas of the primary separation and re-run, cracking fractionation, are condensed with the steam at 109° F.,—the equivalent being 212° F.; the higher boiling points of their chain condensing in the atmospheric radiation condensers; the total of same being discharged jointly with the condensing water, to the condensate, separating tank, from which the water overflows to the coil condensers, and the napthas to the receiving pump, that discharge same at 100° F. to storage.

The invention has a number of important features as follows:

1. Flow nozzles, calibrated and based on a definite size of pipe, steam, pressure and temperature, for a "steady flow", and with the pressure in the chamber before the orifice of same reduced to 55% of the nozzle's initial pressure, will deliver a constant volume of steam, regardless of any variance, below the "critical pressure" and is the governor of the rate of capacity of the process.

2. Crude petroleum drawn into the process by virtue of the sub-atmospheric pressure within same, to varient altitudes relatively proportional to same, in hydrostatic balance; a quiescent flow through the process, inductively, until changed to a turbulent flow, by virtue of the ebullition, with a consequent vaporization, reduced and unbalanced altitudes, with potential hydrostatic heads, changed to kinetic heads and adjustment of same, automatically continuous.

3. The first stage of the process is dry or "cracking" distillation, for a large yield of burning oil, for combustion purposes, which take place as the primary separation; the second stage is with steam in direct contact, for the minimization of decomposition of the high grade lubricating fractions, and takes place as the secondary fractionation, through the process of vaporization and subsequent condensation in steam; regenerative re-evaporation in oil, and re-condensation by dissipation of its latent heat of vaporization, through the medium of air of the atmosphere and water.

4. As the oil vapors of the primary separation are condensed in contact with steam, mixed with same, at a lower temperature, also a lower condensing point, the higher boiling point oil vapors will condense, relatively with the temperature of the steam which does not condense, but flows on in its course, carrying with it the lower boiling point oil vapors, to a succeeding stage of the process, of less temperature, until the fractional condensation is complete.

5. The liquids of two condensed vapor fractions, of widely differing boiling points, due to the isolation of their intermediate boiling point fraction, are mingled together, each at or near their respective boiling point and with a lower surface pressure; the excess heat of liquid content of the higher boiling point fraction converts into latent heat of vaporization, for the lower boiling point fraction and vaporization of same results, with the lowered heat of liquid content, of the higher boiling point fraction, proportional to the temperature balance; and the heat exchange is at a much higher temperature than would be possible in a natural ebullition, and the "cracking" or disassociation of the fraction so vaporized intensified.

6. Vapor fractions, with a chain of boiling points at high temperatures, pass through coils, or the like, submerged in water, which is kept at its boiling point by the heat of the higher temperature of the vapor, exchanging with and vaporizing the lower boiling point water, at its atmospheric vaporizing temperature.

The heat absorbing capacity of the water is increased; and its minimum and maximum temperature equal and constant. The vapors being in vacua will have an equivalent condensing point, relative to the temperature of the water, proportionate to the vacua; and the lower boiling points of the chain in the fractions, with condensing points below the minimum temperature of the water, will not condense in the coil, or like, but pass through same, with the steam, by which it was vaporized, to a lower temperature of the process.

The higher boiling points of the chain in the fraction, with condensing points above the maximum temperature of the water, boiling at atmosphere, will condense, and entrain by gravity to a container, for disposal.

7. When one of the containers, that are duplicated for each fraction, is filled, the entrainment of the fraction is shunted to the other; steam at a reduced pressure and temperature turned into the container, on top of the oil, forms a steam piston, which forces the oil to egress at the bottom of same, through pipes leading to storage or treatment.

The contrast of volumes, for equal weight of steam and oil, is evidence of the practicability; and the continuity of dispatch without pulsation desirable. All fractions are re-run continuously, except the lowest boiling point fractions which are carried along jointly with the exhausting steam to the jet condenser. The residuum that goes to the coking still periodically is also an exception to the continuous re-run of the fractions.

8. The constant level feed tank maintains a constant altitude relative to the several variable altitudes within the several elements of the process, pro rata to the sub-atmospheric pressure within the same element, and is changeable only by the vaporization, which dominates the flow through the process of constant altitudes.

9. The heat content of unavoidable heat loss, due to temperatures below the utility of the process, but above the atmosphere, is partly dissipated to the atmosphere, when fractionations of its vapors are not required in the process and the amount of water for condensation, in the final disposal, is minimized.

Briefly stated, the process is as follows: The oil entering the bottom zone of still H is assumed to be at 32° F. and therefore contains 16 B. t. u.'s of heat per pound. 350 pounds of oil is the unit of weight used as a basis for the following calculations. As the oil flows up through the steam zone, which is the upper part of the still, it will be observed that the various properties of the steam so passing through the still are indicated diagrammatically on Fig. 1. The little vaporization that takes place in the first four stills, due to the vacuum and consequently reduced boiling points, is not considered as of consequence, but is considered as a product from still D and is known as light crude naphtha. As the temperature of the oil progressing through stills H, G, F, and E, has been raised in temperature to a point corresponding with the boiling point of the first fraction, the second fraction of still C represents heavy naptha, due to the higher temperature of that still. The natural lamp distillate will be vaporized in still B, and in still A, the fraction of fuel or gas oil will distill over.

It is to be understood that the oil passing through pipe 11, shown in Fig. 6, will rise up through the tube and above the top sheet of the tube 9 to a predetermined height as represented on the flow sheet by the indicia "Top oil zone". The steam flow through the still A and through the remaining stills has its temperature successively lowered to the final still H. The oil which is drawn into still H has its temperature gradually increased until it reaches the maximum in still A from which the residue or the last fraction is withdrawn. It will be noted that the oil flows in an opposite direction to that of the steam and the vapors from the oil; that the pressures in the various stills are so varied that the oil from the preceding still will be drawn into the succeeding still at a progressively increasing temperature, while the steam moving in the opposite direction has a progressively decreasing temperature. The steam expands giving up its heat until it is discharged from the initial still H.

We claim:

1. A process for separating hydrocarbon oils into its component fractions which comprises maintaining in a series of interconnected units progressivly varying pressures, a portion of the series of units having pressures above atmospheric, an intermediate unit of the series being at atmospheric pressure while the remaining portions of the units being below atmospheric pressure, introducing the oils into the units of the system by means of the sub-atmospheric pressures in one portion of the series of units, causing superheated steam under pressure to flow through the first-mentioned portion of the series of units while permitting the steam to expand in those portions of the series of units which have a pressure below atmospheric and utilizing the pressures of the steam in the different units for maintaining levels of the oil at variant altitudes in the unit system, said levels being relatively proportional to the pressures in the respective units while maintaining a quiescent flow of oil through a portion of the system, removing certain of the component fractions of the units from the unit in which is contained the greatest vacuum, then separating and recovering the fractions obtained from the last-mentioned unit.

2. A process for separating hydrocarbon oils into its component fractions which comprises maintaining in a series of interconnected units progressively varying pressures, a portion of the series of units having pressures above atmospheric, an intermediate unit of the series being at atmospheric pressure while the remaining portions of the units being below atmospheric pressure, introducing the oils into the units of the system by means of the sub-atmospheric pressures in one portion of the series of units, causing superheated steam under pressure to flow through the series of units while permitting the steam to expand in those portions of the series of units which have a pressure below atmospheric and utilizing the pressure of the steam in the different units for maintaining levels of the oil at variant altitudes in the unit system, said levels being relatively proportional to the pressures in the respective units while maintaining a quiescent flow of oil through a portion of the system, removing certain of the component fractions of the units from the unit in which is contained the greatest vacuum, then separating and recovering the fractions obtained from the last-mentioned unit.

3. A process for separating hydrocarbon oils into its component fractions which comprises maintaining in a series of interconnected units progressively varying pressures, a portion of the series of units having pressures above atmospheric, an intermediate unit of the series being at atmospheric pressure while the remaining portions of the units being below atmospheric pressure, introducing the oils into the units of the system by means of the sub-atmospheric pressures in one portion of the series of units, causing superheated steam under pressure to flow through the first-mentioned portion of the series of units while permitting the steam to expand in those portions of the series of units which have a pressure below atmospheric and utilizing the pressures of the steam in the different units for maintaining levels of the oil at variant altitudes in the unit system, said levels being relatively proportional to the pressures in the respective units, removing certain of the component fractions of the units from the unit in which is contained the greatest vacuum, then separating and recovering the fractions obtained from the last-mentioned unit.

4. A process for separating hydrocarbon oils into its component fractions which comprises maintaining in a series of interconnected units progressively varying pressures, a portion of the series of units having pressures above atmospheric, an intermediate unit of the series being at atmospheric pressure while the remaining portions of the units being below atmospheric pressure, introducing the oils into the units of the system by means of the sub-atmospheric pressures in one portion of the series of units, causing super-heated steam under pressure to flow through the series of units while permitting the steam to expand in those portions of the series of units which have a pressure below atmospheric and utilizing the pressures of the steam in the different units for maintaining levels of the oil at variant altitudes in the unit system, said levels being relatively proportional to the pressures in the respective units, removing certain of the component fractions of the units from the unit in which is contained the greatest vacuum, then separating and recovering the fractions obtained from the last-mentioned unit.

ALFRED R. EARL.
THOMAS W. REEVES.